Nov. 23, 1965 R. G. KLIMO 3,219,910

SILICON CONTROLLED RECTIFIER CIRCUIT

Filed Oct. 31, 1960

Inventor
ROBERT G. KLIMO

By Hill, Sherman, Meroni, Gross & Simpson
Attys.

United States Patent Office 3,219,910

Patented Nov. 23, 1965

3,219,910

SILICON CONTROLLED RECTIFIER CIRCUIT

Robert G. Klimo, Cleveland, Ohio, assignor to TRW Inc., a corporation of Ohio

Filed Oct. 31, 1960, Ser. No. 66,105
5 Claims. (Cl. 321—47)

This invention relates to a silicon controlled rectifier circuit and more particularly to a silicon controlled rectifier circuit in which the rectifier is positively and accurately turned on at the proper times and which is safe and highly stable in operation despite variations in temperature and other operating conditions.

Silicon controlled rectifiers are PNPN devices forming the semiconductor equivalents of gas thyratrons. With such rectifiers, it is possible to control large amounts of power with a very high degree of efficiency. They have many advantages over power transistors including the ability to operate at higher temperatures, a lower voltage drop at high current and lower control power requirements. Nevertheless, such rectifiers have not been completely stable in operation, particularly at elevated temperatures.

This invention is based upon the discovery that the operation of a silicon controlled rectifier may be greatly improved by using an inductance between the gate electrode thereof and the cathode thereof, rather than a resistor as used in prior circuits. It is found that the improved results are due in part to the fact that the inductance may present a very low direct current resistance, and as a result, the breakover characteristic of the rectifier is made much more uniform despite variations in temperature. Stable operation is possible even at relatively high temperatures.

In addition, it is found that the inductance has the advantage of producing a relatively high impedance with respect to control pulses, and it is found possible to produce very rapid rise times in the voltage and current in the gate circuit, to assure positive and accurate turning on of the rectifier.

A further feature of the invention is that the inductance is readily used in conjunction with a unijunction transistor circuit in a manner as will be described.

This invention contemplates other objects, features and advantages which will become more fully apparent from the following detailed description taken in conjunction with the accompanying drawing, which illustrates a preferred embodiment and in which.

Figure 1:
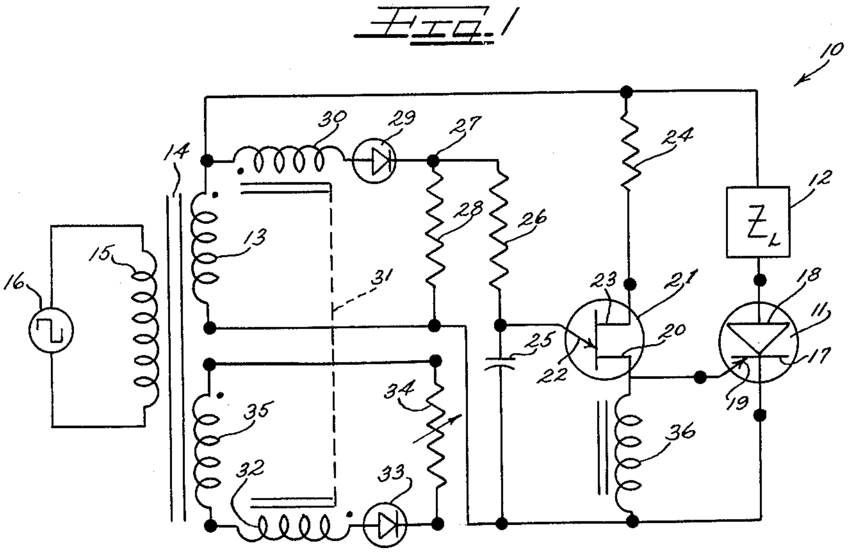
FIGURE 1 shows a silicon controlled rectifier circuit constructed in accordance with the principles of this invention.

The circuit of this invention, generally designated by reference numeral 10, comprises a silicon controlled rectifier 11 connected in series with a load 12 and a secondary winding 13 of a transformer 14 having a primary winding 15 connected to a square wave voltage source 16. The silicon controlled rectifier 11 includes a cathode 17, an anode 18 and a gate electrode 19, as diagrammatically illustrated.

During negative half-cycles, when the upper terminal of the winding 13 is negative relative to the lower terminal thereof, the rectifier 11 blocks the flow of current, as in an ordinary rectifier. During positive half-cycles, flow of current from the anode 18 to the cathode 17 is blocked unless the forward breakover voltage of the rectifier 11 is exceeded, or unless a small control voltage is applied to the gate electrode 19 to initiate conduction. Once the device is in a high conduction state, it will continue conduction indefinitely after removal of the gate signal until the anode current is interrupted or diverted for a short time interval after which the device regains its forward blocking capabilities.

To control the average current through the load 12, a signal is applied to the gate electrode 19 at a certain time in each cycle, to control the percentage of time that the rectifier 11 conducts in each cycle. For this purpose, the gate electrode 19 is connected to a first base electrode 20 of a unijunction transistor 21, having an emitter 22 and having a second base electrode 23 connected through a resistor 24 to the upper terminal of the transformer secondary winding 13. The unijunction transistor 21 is arranged to apply a positive current pulse to the gate electrode 19, to initiate conduction of the rectifier 11.

To control the time in which the unijunction transistor 21 conducts, the emitter 22 thereof is connected through a capacitor 25 to the lower terminal of the winding 13 and through a resistor 26 to a circuit point 27. Circuit point 27 is connected through resistor 28 to the lower side of the secondary winding 13 and is connected to the upper terminal of the winding 13 through a diode 29 and a magnetic amplifier winding 30. Winding 30 is coupled magnetically, as indicated by dotted line 31, to another magnetic amplifier winding 32 which is connected in series with a diode 33, an adjustable resistor 34 and a second secondary winding 35 on the transformer 14.

In operation, a magnetic flux is induced on the core of the magnetic amplifier 30–32 during the negative half-cycle of the square wave, by current flow from the winding 35 through winding 32, diode 33 and resistor 34. This flux, termed the reset flux or field, is determined by the value of the adjustable resistor 34. During the positive half-cycle, an opposing field is developed by current flow from the winding 13 through winding 30, diode 29 and resistor 28. During the initial portion of the positive half-cycle, the magnetic amplifier core is unsaturated and the winding 30 presents a high impedance, so that only a small portion of the voltage of the secondary winding 13 is developed across the resistor 28. At a certain time, however, the magnetic amplifier core becomes saturated to reduce the effective impedance of the winding 30 and to produce at the circuit point 27 a voltage approaching the voltage developed across winding 13. The time in each cycle at which saturation occurs is determined primarily by the magnitude of the reset field developed in the preceding half-cycle 13 which is determined by the value of the adjustable resistor 34.

When the relatively highly positive signal is developed at circuit point 27, it is applied through resistor 26 to the capacitor 25, to charge the capacitor 25. When the voltage across capacitor 25 reaches a certain value, the junction between emitter 22 and the first base 20 of the unijunction transistor 21 breaks down and the capacitor 25 discharges into the gate 19 of the silicon controlled rectifier 11, to initiate conduction thereof.

According to this invention, an inductor 36 is connected between the gate electrode 19 and the cathode 17 of the silicon controlled rectifier 11. It has been discovered that through the use of the inductor 36, greatly improved operation is obtained, particularly in regard to accurate timing of the turning on of the silicon controlled rectifier 11 and in regard to stability despite variations in temperature and other operating conditions.

Figure 2:
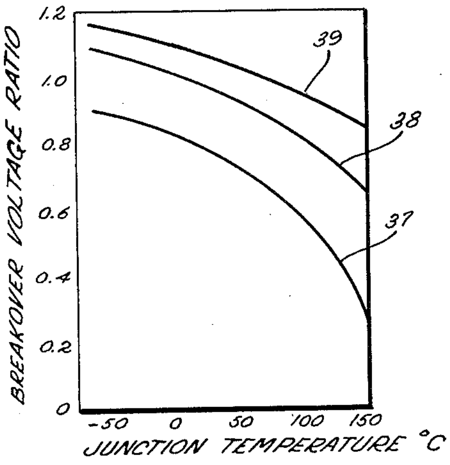
FIGURE 2 is a graph illustrating the relationship of breakover voltage to junction temperature of the silicon controlled rectifier used in the circuit of FIGURE 1.

The improved results obtained through the use of the inductor 36 may be explained in part by the graph of FIGURE 2 which shows a relationship which has been found to exist between the breakover voltage of the silicon controlled rectifier and the temperature thereof. Referring to FIGURE 2, the horizontal coordinate of the graph is the junction temperature in degrees centigrade while the vertical coordinate is the ratio of the breakover voltage to the breakover voltage obtained at 25° C. with a gate electrode to cathode resistance of about 1000 ohms. Curve 37 was obtained with an open circuit between the gate electrode and the cathode and it will be noted that the breakover voltage is relatively low and, in addition, drops off rapidly at elevated temperatures. Curve 38 was obtained with a gate electrode to cathode resistance of about 1000 ohms and shows that improved results are obtained, although there is still a substantial drop-off at high temperatures, the ratio being less than 0.65 at 150° C.

Curve 39 was obtained with the inductor 36 having a very low direct current resistance on the order of 10 ohms. It will be noted that the breakover voltage stays quite high and does not drop below 0.85, even at 150° C. It is believed that this explains the greatly improved safety and stability of operation obtained with the use of the inductor 36.

Figure 3:
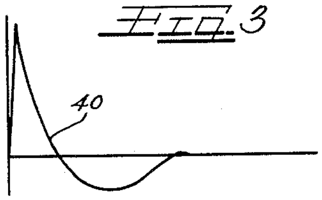
FIGURES 3 and 4 are graphs illustrating the voltage current waveforms exhibited in the gate circuit of the silicon controlled rectifier of FIGURE 1.
Figure 4:
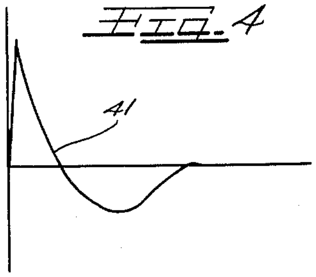

Curve 40 in FIGURE 3 shows the variation of the voltage of the gate 19 with time, following triggering of the unijunction transistor 21. The similar curve 41 in FIGURE 4 shows how the gate current varies with time. Both curves were, of course, obtained with the inductor 36. It will be observed that both the voltage at the gate and the current in the gate exhibit very rapid rise times, which explains the positive and accurate turning on of the silicon controlled rectifier, when the inductor 36 is used.

It is further to be noted that the inductor 36 provides an ideal load for the unijunction transistor 21, since it normally presents a low impedance, equal to its direct current resistance, while at the same time it presents a very high effective impedance when the transistor 21 is triggered, to thereby divert the current flow from the base 20 to the gate of the silicon controlled rectifier.

It is not, of course, necessary that the magnetic amplifier arrangement as illustrated be used for controlling the circuit, although the illustrated system is quite satisfactory. It should also be noted that the silicon controlled rectifier need not be powered from the transformer winding 13, but may be connected in circuit with a separate supply. For example, it may be connected in circuit with a battery in an inverter circuit.

It will be understood that other modifications and variations may be effected without departing from the spirit and scope of the novel concepts of this invention.

I claim as my invention:

1. In a circuit including a silicon controlled rectifier having an anode, a cathode and a gate electrode, a series circuit including a load and the cathode-anode path of said rectifier, means operative during certain time intervals for cyclically placing said cathode at a positive potential relative to said anode to prevent conduction through said rectifier, means connected to said series circuit to apply a voltage of such polarity as to place said anode at a positive potential relative to said cathode during alternate time intervals, means connected in circuit with said cathode and said gate electrode for applying positive pulses to said gate electrode at a certain time during each of said alternate time intervals to render said rectifier conductive, and means connected in circuit with said cathode and said gate electrode to provide a high impedance with respect to said pulses while providing a low direct current resistance to increase the breakover voltage of said rectifier.

2. In a circuit including a silicon controlled rectifier having an anode, a cathode and a gate electrode, a series circuit including a load and the cathode-anode path of said rectifier, means operative during certain time intervals for cyclically placing said cathode at a positive potential relative to said anode to prevent conduction through said rectifier, means connected to said series circuit to apply a voltage of such polarity as to place said anode at a positive potential relative to said cathode during alternate time intervals, a unijunction transistor including first and second base electrodes and an emitter electrode, means connecting said first base electrode to said gate electrode of said silicon controlled rectifier, impedance means for connecting said second base electrode to a source of potential positive with respective to said cathode, a capacitor connected between said emitter electrode and said cathode, means for charging said capacitor to reach a certain voltage at a certain time during each of said alternate time intervals to break down the emitter to first base electrode path of said unijunction transistor and apply a triggering pulse to said gate electrode, and means connected in circuit with said cathode and said gate electrode to provide a high impedance with respect to said triggering pulses while providing a low direct current resistance to normally present a low resistance load for said unijunction transistor and to increase the breakover voltage of said silicon controlled rectifier.

3. In a circuit including a silicon controlled rectifier having an anode, a cathode and a gate electrode, a series circuit including a load and the cathode-anode path of said rectifier, means operative during certain time intervals for cyclically placing said cathode at a positive potential relative to said anode to prevent conduction through said rectifier, means connected to said series circuit to apply a voltage of such polarity as to place said anode at a positive potential relative to said cathode during alternate time intervals, a capacitor, means for charging said capacitor, means including a discharge device connecting said capacitor in circuit between said cathode and said gate electrode for discharging said capacitor at a certain time during each of said alternate time intervals to apply a triggering pulse to said gate electrode, and means connected in circuit with said cathode and said gate electrode to provide a high impedance with respect to said triggering pulses while providing a low direct current resistance to increase the breakover voltage of said rectifier.

4. In combination, a power supply having an output circuit, a solid state device connected in said output circuit for controlling flow of current from said power supply to a load, said solid state device having input electrodes for receiving control current pulses to control current flow in said output circuit, said input electrodes having an external electric circuit providing a path for direct current flow between said input electrodes having a direct current resistance providing stable operation of said solid state device over a substantial temperature range with respect to the forward breakover voltage of said solid state device, said external electric circuit having an inductor in series therein between said input electrodes of said solid state device, and control voltage means connected across said inductor for supply control current pulses to said input electrodes of said solid state device and providing control voltage pulses having a rate of change with respect to time to produce a reactive component of voltage across said inductor of substantially greater magnitude than the magnitude of the resistive component of voltage across said inductor produced by said control voltage pulses so that said inductor provides a substantially reduced shunting of said control current pulses to said input electrodes than would a resistor having a direct current resistance equal to the direct current resistance of said inductor.

5. In combination, a solid state device for controlling supply of current to a load, said solid state device having a pair of input electrodes including a control electrode for receiving control current pulses to control current flow to said load, said input electrode having an external electric circuit providing a path for direct current flow between said input electrodes having a D.C. resistance value of the order of 10 ohms and such as to provide stable operation of said solid state device over a substantial temperature range, said external electric circuit having a self-inductive reactor in series therein between said input electrodes of said solid state device, said self-inductive reactor having a D.C. resistance of the order of 10 ohms, and control voltage means connected across said self-inductive reactor for supplying control current pulses to said control electrode of said solid state device, said control voltage means providing control voltage pulses having a rate of change with respect to time to produce a reactive component of voltage across said self-inductive reactor of substantially greater magnitude than the magnitude of the resistive component of voltage across said self-inductive reactor produced by said control voltage pulses so that said self-inductive reactor provides a low resistance circuit between said input electrodes of said solid state device with respect to direct current flow therebetween without substantial shunting of the control current pulses from said control voltage means.

References Cited by the Examiner

UNITED STATES PATENTS

| | | | |
|---|---|---|---|
| 2,925,546 | 2/1960 | Berman | 321—8 |
| 2,939,064 | 5/1960 | Momberg et al. | 323—22 |
| 2,981,880 | 4/1961 | Momberg et al. | 323—22 |
| 3,047,789 | 7/1962 | Lowry | 321—18 |

OTHER REFERENCES

Notes on the Application of the Silicon Controlled Rectifier, General Electric, December 1958, Figure 9.2 (page 41), 322–22CR.

General Electric Controlled Rectifier Manual, published by Semiconductor Products Department of General Electric, copyright Mar. 21, 1960, pages 94 and 132 relied on; copy in Division 48.

LLOYD McCOLLUM, *Primary Examiner.*

SAMUEL BERNSTEIN, *Examiner.*